Oct. 14, 1969    P. C. GRANATA, JR., ET AL    3,472,978
MEMORY AND CONTROL DEVICE WITH DISC CONTACT PLATES ON A
LINEARLY MOVABLE SHAFT THAT ARE ADJUSTABLE
WITH RESPECT TO THE SHAFT
Filed Feb. 29, 1968    3 Sheets-Sheet 1
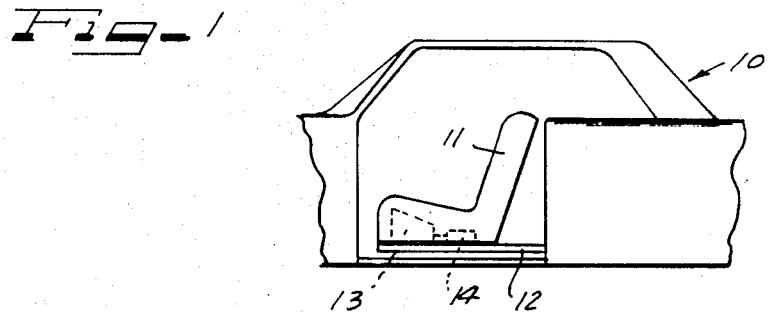
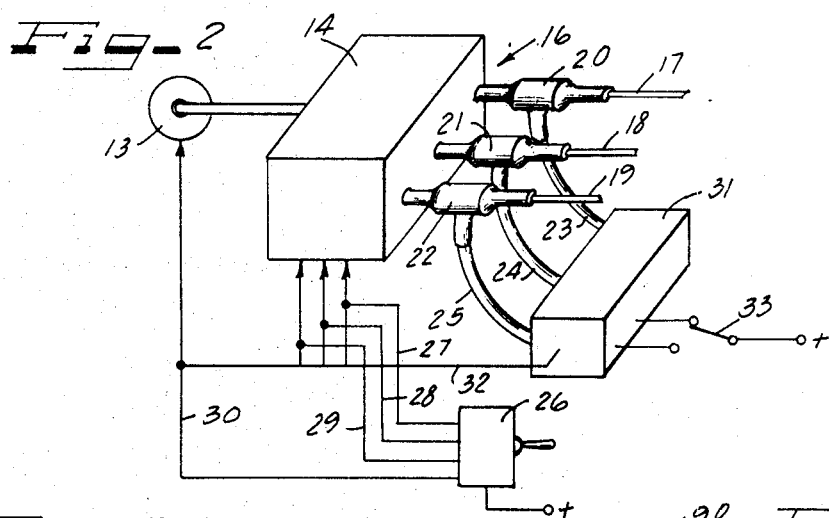
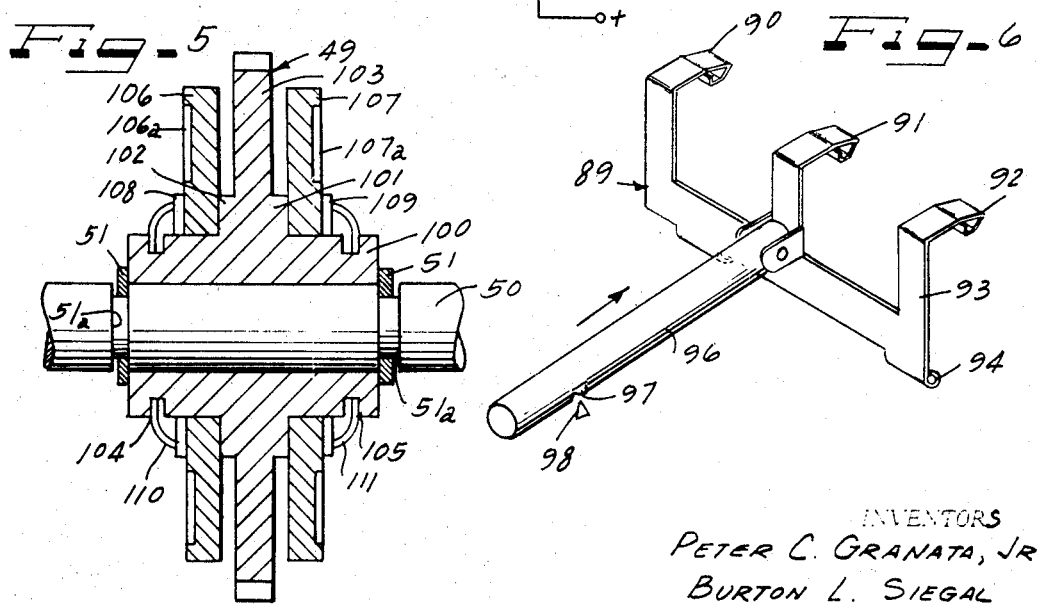
INVENTORS
PETER C. GRANATA, JR.
BURTON L. SIEGAL
EDWARD J. ZEISSLER
BY Hill, Sherman, Meroni, Gross & Simpson ATTORNEYS

INVENTORS
PETER C. GRANATA, JR.
BURTON L. SIEGAL
EDWARD J. ZEISSLER
ATTORNEYS

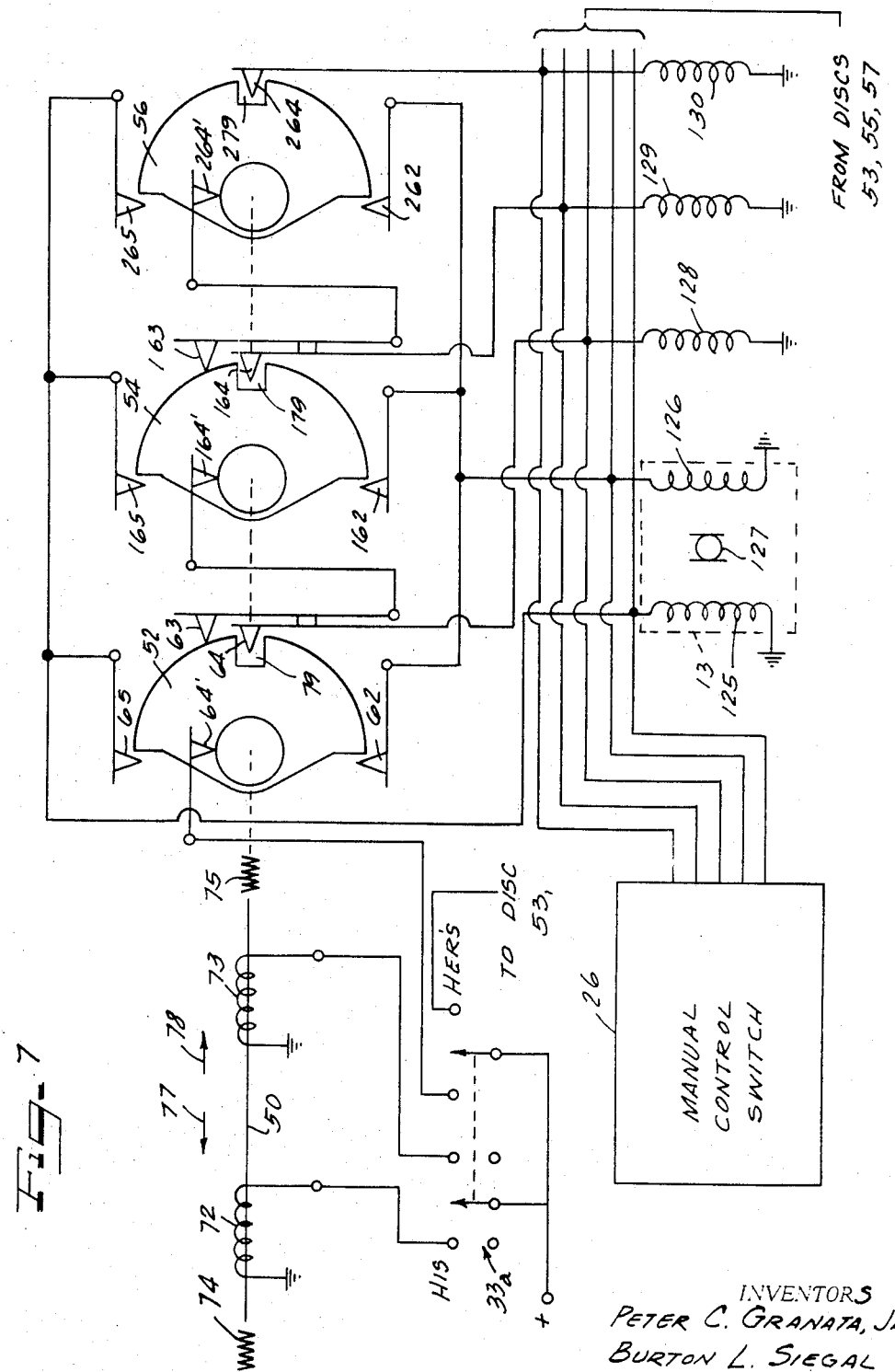

United States Patent Office 3,472,978
Patented Oct. 14, 1969

3,472,978
MEMORY AND CONTROL DEVICE WITH DISC CONTACT PLATES ON A LINEARLY MOVABLE SHAFT THAT ARE ADJUSTABLE WITH RESPECT TO THE SHAFT
Peter C. Granata, Jr., Chicago, Burton L. Siegal, Skokie, and Edward J. Zeissler, Schiller Park, Ill., assignors of fifty percent to Peter C. Granata, Jr., Chicago, and fifty percent to Edward Andrychowski, Franklin Park, Ill.
Filed Feb. 29, 1968, Ser. No. 709,365
Int. Cl. H01h 35/00, 3/32
U.S. Cl. 200—52                                     8 Claims

ABSTRACT OF THE DISCLOSURE

This invention is directed to an electromechanical memory positioning device which has presetting means for indexing a plurality of movable conductive surfaces to a position corresponding to a home position of the device which is to be positioned. Electrically energizable drive means are connected to the device being positioned to move the device to a desired position when displaced therefrom. A movable member is mechanically connected to the drive means for movement therewith and which movement corresponds to the movement of the device being positioned. A contoured electrically conductive surface is formed on each of the movable members and includes areas of non-conductance. A plurality of contact switches engage the conductive surface and when the contact switches become aligned with the non-conductive areas thereon the circuits are opened to stop the energization of the drive means and stop the movement of the device being positioned.

Background of the invention

This invention relates generally to an automatic positioning device, and more particularly to a positioning device which includes electromechanical memory means which control the movement of a positionable device to cause the device to assume a predetermined desired position when displaced therefrom.

The memory control system of the present invention can be used to control machine tools that require only nominal resolution of dimensions, for example, to control the positioning of an X, Y, Z plotter, a rotary fixture, a revolving tool selector, or a mechanical speed control.

Although the electromechanical memory positioning system of the present invention can be used to control the positioning of any number of devices, it has particular utility when used in conjunction with a power drive mechanism to control the positioning of an automobile front seat which is electrically driven.

In designing a memory positioning system to control a power seat of an automobile several problems were encountered. One problem is controlling the direction of a six way power seat from a single bi-directional motor, which is commonly used. Another problem was to provide an automatic control system which would work in conjunction with the manual control without effecting the operation of the automatic control. This problem is yet further complicated by customer requirements that the seat go directly to the desired position in the most direct manner without going first to one end of a given travel and then to the desired position. Yet another problem encountered in providing a system of this kind for controlling the positioning of automobile seats is that the desired position of each user is different and therefore the control system must include means for setting the desired position required by each user. Furthermore, it is desired that the control system for an automobile seat include at least two preset positions which may be selected by a double throw switch. Therefore, the device must respond only to one of the selected positions and ignore the other position. Another problem when designing the memory positioning system of the present invention for use in automobile seats is that the device must be relatively compact and be adaptable to the motor drive mechanism already furnished for positioning the seat.

Summary of the invention

Accordingly, an object of the present invention is to provide an electromechanical memory positioning system which will control the movement of a device in a plurality of directions from a single bidirectional motor.

Another object of the present invention is to provide an electromechanical memory positioning system which can be preset to any desired position and thereafter cause the device being moved to return to that position automatically.

Another object of the present invention is to provide an electromechanical memory positioning device used for controlling the positioning of an automobile seat to provide at least two preselected positions which may be selected from one or more switches.

Another object of the present invention is to provide an electromechanical memory positioning device which can be preset to a plurality of desired positions and which device is simple and econonical to manufacture.

Briefly, the positioning system of the present invention when used to control the operation of a power seat of an automobile includes a plurality of flexible drive shafts receiving power from a centrally located transmission which, in turn, is connected to a bi-directional electric motor. The drive shafts are coupled to the motor by solenoid clutches. A power take-off fitting is provided on each of the drive shafts for connection of a second flexible drive shaft which is used to control the operation of components of the memory positioning system. The three flexible drive shafts from the transmission correspond to the three positions available for the power seat corresponding to horizontal, front vertical, and rear vertical directions of movement. These directions of movement are controlled by a single bi-directional motor having clockwise and counterclockwise modes of rotational movement. Only two selectable positions are shown and correspond to the HIS position and HER'S position of the selector switch.

The three flexible shafts extending from the power take-offs to the memory device include worm gears which, in turn, engage worm wheels to rotate other gears to position a contoured conductive surface in response to the rotation of the flexible shaft. The gearing between the worm wheel and the contoured conductive surface is provided with intentional backlash. The contoured surface is frictionally engaged with the side of one of the gears for movement therewith. This frictional engagement is such that it is sufficient to allow reliable driving of the contoured surface against the force of electric contact fingers engaging the surface, but small enough to allow the surface to be grabbed or held in a fixed position while the gear is driven by the gear train to preset the desired home position. The three gears driven by the corresponding three flexible drive shafts are free to rotate independently of one another about a common shaft but are axially positioned in a fixed location on the shaft. The shaft is free to move axially against a spring bias exerted at both ends of the shaft. The shaft is caused to move axially by bi-directional solenoids positioned about the shaft. A plurality of contact fingers are mounted so as to engage the contoured conductive surface and provide an electric current path therethrough. The contoured surface has areas of non-conductance which, when engaged with certain ones of the contact fingers provide an open circuit to deenergize one of the flexible drive shafts from the transmission.

Brief description of the drawings

FIGURE 1 is a side elevational diagrammatic representation of an automobile which is provided with a power seat controlled by the positioning system of the present invention;

FIGURE 2 is a somewhat diagrammatic representation of the positioning system used to control the seat shown in FIGURE 1;

FIGURE 5 is a detailed elevational sectional view of the drive gear and conductive surfaces of FIGURE 3;

FIGURE 6 illustrates the locking fingers and setting knob for setting a predetermined position into the memory device of FIGURE 3; and FIGURE 7 is a schematic wiring diagram illustrating the electrical connections of the memory system of the present invention.

Brief description of the preferred embodiments

Figure 3:
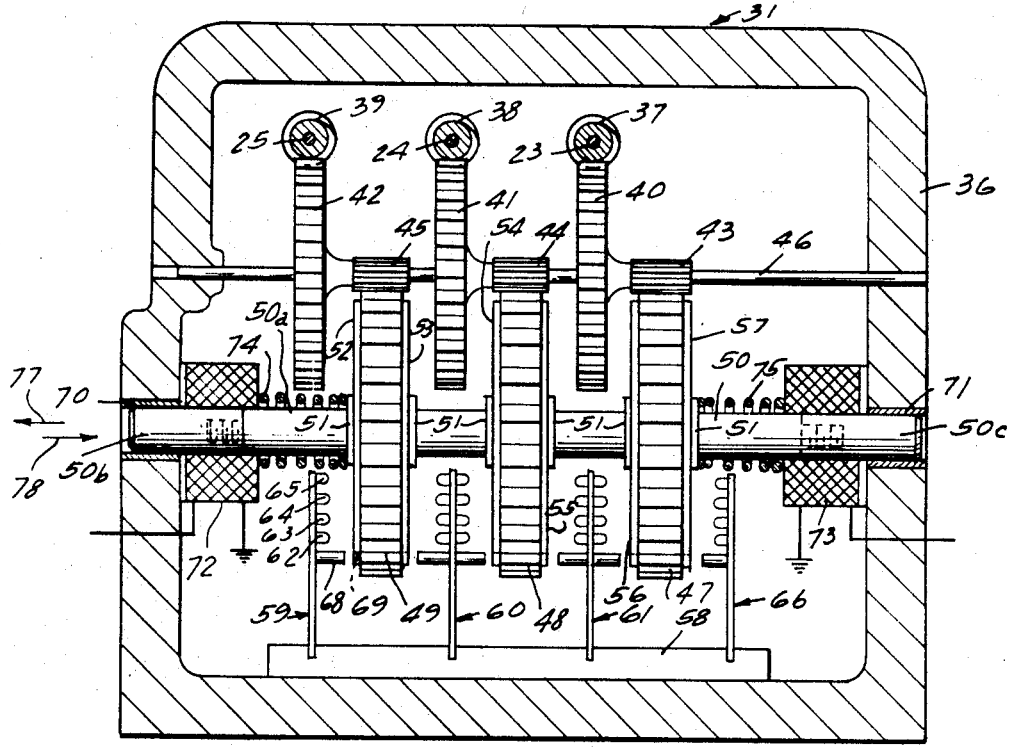
FIGURE 3 is an elevational sectional view of an electromechanical memory device constructed in accordance with the principles of this invention.

Seen in FIGURE 1 is a diagrammatic representation of a portion of an automobile and is designated generally by reference numeral 10. The automobile 10 includes a power seat 11 which moves forward and rearward on a track 12. Other directions of movement, such as up and down and tilt, are also provided. The power seat 11 is driven by an electric motor 13 which, in turn, is connected to a transmission 14. The transmission 14 may have a plurality of flexible drive shafts extending therefrom to control movement of the seat in the various directions. A manual switch or control knob may be provided on the side of the seat, or on the door console of the automobile to provide manual selection of the desired position of the seat 11.

According to the present invention, the seat 11 is provided with an electromechanical memory device which may have, for example, two preselected positions adjustably selectable for the two most frequent positions desired of the seat 11. The memory device is energized by a selector switch labeled HIS and HER'S. For example, when the HIS switch is actuated the seat will move rearwardly to accommodate for a large person, and when the HER'S switch is actuated the seat will move forwardly for a small person. Therefore, once the two desired positions are set into the memory device the seat will faithfully return to the selected position. Additionally, other positions may be had by use of the manual control switch.

Seen in FIGURE 2 is a somewhat diagrammatic representation of the electromechanical memory system constructed in accordance with the principles of this invention, and is designated generally by referance numeral 16. The drive motor 13 is mechanically coupled to the transmission 14 for transporting power through a plurality of flexible drive shafts 17, 18 and 19. Each of the flexible drive shafts 17, 18 and 19 are provided with power take-off gear units 20, 21 and 22 respectively. The gears within the power take-off units 20–22 may be constructed of plastic or other relatively inexpensive material as the gears therein will be operated under a relatively light load condition. Connected to the power take-off units 20, 21 and 22 are flexible shafts 23, 24 and 25 respectively.

The transmission 14 is provided with electrical mechanical clutches for selectively engaging certain ones of the gear units 20, 21 and 22 for applying power to the flexible shafts associated therewith. For example, when the motor 13 and transmission 14 are energized in a conventional manner, by a switch 26, the motor rotates and is mechanically coupled to one of the flexible shafts 17–19 to move the seat 11 in one of six directions. The six directions referred to herein are defined as two directions of movement in three planes, which is the conventional mode of operation of a power seat of an automobile. The electromagnetic clutches with the transmission 14 are are energized through lines 27, 28 and 29 connected to switch 26 for receiving power, for example, from a positive voltage source. The motor 13 is energized through switch 26 via a line 30.

According to the present invention, an electromechanical memory device 31 is arranged for receiving mechanical power from the flexible shafts 23–25 and for delivery electrical power to drive motor 13 and the solenoid clutches of transmission 14 via a multiconductor cable 32. Power is applied to the electromechanical memory device 31 via a selector switch 33 having two selectable positions indicated HIS and HER'S.

Therefore, the electromechanical memory positioning system of FIGURE 2, when used in conjunction with the power seat 11, of FIGURE 1, provides a manual switch 26 for selecting any one of a possible plurality of positions of seat 11, as well as providing the automatic selector switch 33 for selecting either one of a pair of preselected positions.

For a better understanding of the electromechanical memory device 31, reference is now made to FIGURE 3. The device 31 includes a housing 36 for receiving the ends of the flexible shafts 23, 24 and 25 which extend through the rear wall of the housing, as seen in the figure. The ends of the flexible shafts 23, 24 and 25 each have worm gears 37, 38 and 39 secured thereto. The worm gear 37 engages a worm wheel 40, the worm gear 38 engages a worm wheel 41, and the worm gear 39 engages a worm wheel 42. Associated with each of the worm wheels 40–42 is a small spur gear 43, 44 and 45 respectively. The spur gears 43–45 rotate with their respective worm wheels. Each of the worm wheels 40–42 are mounted for rotation on a common shaft 46 which extends between the side walls of housing 36. The worm wheels, and associated spur gears are prevented from axial movement on the shaft 46 by conventional means such as retainers or spacers.

Engaging the small spur gear 43 is a large spur gear 47 which rotates in response to rotation of gear 43. Similarly, a large spur gear 48 is meshed with spur gear 44 and a large spur gear 49 is meshed with a spur gear 45. It will be understood that the gear reuction between the worm wheels 37–39 and the large spur gears 47–49 is such as to cause less than 360° rotation of the large spur gears in response to the maximum distance of travel in each of the directions of travel of the seat 11. The spur gears 47–49 are mounted for rotation about a shaft 50; each of the spur gears 47–49 rotates independently of the other about the shaft 50 and, therefore, the shaft 50 may be held from rotation about its axis.

According to the present invention, a pair of contoured conductive surfaces 52 and 53 are frictionably engaged with the side walls of spur gear 49 for rotation therewith. Similarly, contoured conductive surfaces 54 and 55 frictionally engage the side walls of spur gear 48, and contoured conductive surfaces 56 and 57 frictionally engage the side walls of spur gear 47. Each of the contoured conductive surfaces 52–57 are provided with one or more non-conductive areas so as to provide an open circuit connection during various phases of operation of the device. Additionally, each of the contoured conductive surfaces 52–57 are provided with a setting notch to allow the conductive surfaces to be rotated relative to their spur gear and positioned to a desired location on the spur gear corresponding to the desired location of the power seat 11. The setting means includes extended portions for engaging the notches of conductive surfaces 52, 54 and 56 thereby setting the three end positions in three planes of movement of the power seat 11. Similarly, a separate setting device is provided for engaging notches in conductive surfaces 53, 55 and 57 to determine the end position and the three planes of movement of power seat 11 for a second location.

A contact block 58 is secured to the bottom wall of the housing 36 and includes a contact assembly 59 extending upwardly therefrom and adjacent the contoured conductive surface 52. Similarly, a contact assembly 60 extends upwardly from the contact block 58 and between the conductive surfaces 53 and 54. A contact assembly 61 extends from the block 58 and between the conductive surfaces 55 and 56, and a contact assembly 66 extends upwardly and terminates adjacent the conductive surface 57.

The contact assembly 59 comprises a plurality of extended contact fingers positioned one behind the other, as seen in FIGURE 3 and support at the ends thereof contacts 62, 63, 64 and 65 respectively. It will be understood that other contacts may be positioned behind those shown and therefore are not visible in the figure. Secured to one of the contact fingers extending from the block 58 is a protuberance 68 which extends toward the outer periphery of the contoured electrical surface 52 to slidably engage the surface and prevent contact 63 from making electrical connection with the contoured surface until the protuberance 68 is aligned and engages a notch 69 formed in the contoured surface 52. This feature insures that the clutch driving the flexible shaft 25 has positioned the contoured surface 52 at the desired home position before electrical power is transferred from the contoured surface 52 to the contoured surface 54. Each of the contact assemblies 60, 61 and 66 are provided with protuberances thereon for engaging notches in the contoured surface associated therewith to perform a similar function and in like manner.

The shaft 50 is disposed within a pair of bushings 70 and 71 which are supported by opposite side walls of the housing 36. The bushings 70 and 71 are axially aligned with one another and with the axis of the shaft 50. The shaft 50 may comprise a ferromagnetic center portion 50a and a pair of non-magnetic ends 50b and 50c. The ends 50b and 50c are secured to the magnetic portion 50a by suitable means such as a stud and thread arrangement.

An electromagnetic coil 72 is positioned about the shaft 50 near the region of the end 50b, while an electromagnetic coil 73 is positioned about the shaft 50 in the region of the end 50c. The shaft 50 is biased to maintain a neutral position, as seen in FIGURE 3, by a pair of springs 74 and 75. The shaft 50 is then free to move axially in the directions indicated by the arrowed lines 77 and 78.

When electromagnetic coil 72 is energized, the ferromagnetic portion 50a of shaft 50 is drawn into the magnetic coil thereby shifting the entire shaft 50 and the three spur gears mounted thereon in the direction of arrowed line 77. This action will cause the contoured conductive surfaces 52, 54 and 56 to engage contact switch assemblies 59, 60 and 61 thereby completing the necessary electrical circuitry to energize the motor and electromagnetic clutches of the drive system. For example, the movement of shaft 50 in the direction of arrowed line 77 may correspond to the selection of the HIS button, while energization of the electromagnetic coil 73 moves the shaft 50 in the direction of arrowed line 78 and corresponds to the HER'S selection. That is, contoured conductive surfaces 52, 54 and 56 represent the HIS electric circuit arrangement, while contoured conductive surfaces 53, 55 and 57 represent the HER'S circuit arrangement.

Figure 4:
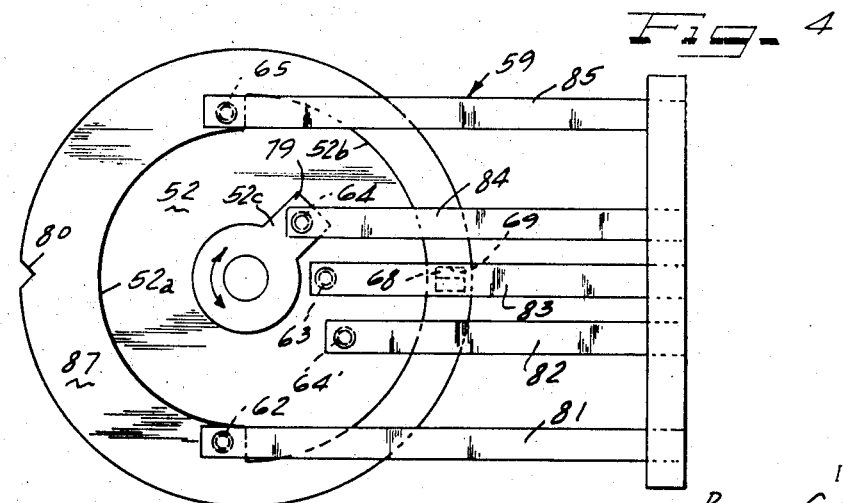
FIGURE 4 is a side view of the contoured conductive surface and electric contacts of FIGURE 3.

For a better understanding of the cooperation between the contoured conductive surfaces and the switch assemblies adjacent thereto reference is now made to FIGURE 4. A side view of the contact assembly 59 and the contoured conductive surface 52 are shown rotated in the plane of view 90° from that shown in FIGURE 3. For purposes of simplicity, the large spur gear 49 is now shown. The contoured conductive surface includes a minor diameter portion 52a and a major diameter portion 52b. Near the center of the conductive surface 52 is a cutout portion 52c which forms a non-conductive area 79 to provide an open circuit connection with contactor 64 when in alignment therewith. A notch 80 is formed at the outer periphery of the disc 52 to provide means for engaging the disc and setting the position of the disc relative to the largest spur gear 49.

The contact switch assembly 59 includes a plurality of contact fingers 81, 82, 83, 84 and 85 for supporting the contacts 62, 64', 63, 64 and 65 respectively. In the neutral position of disc 52 the contacts 62 and 65 are arranged to engage the non-conductive area radially outwardly of the minor diameter portion 52a. When the conductive surface on the disc is displaced from the position shown in FIGURE 4, one or the other of the contacts 62 and 65 will operate the drive motor 13 clockwise or counterclockwise and contact 64 will operate the clutch engaging the shaft 25 of FIGURE 2 to position the seat 11. Furthermore, it will be understood that when the conductive surface is displaced from the home position, contact point 63 is held away from the conductive surface by the protuberance 68 which engages the outer periphery of the disc. On the other hand, when the disc reaches the home position, contacts 62 and 65 provide an open circuit as well as contact 64 while contact 63 now engages the conductive surface to supply power to the next succeeding conductive surface 54.

To change the position of each of the contoured conductive surfaces 52, 54 and 56 relative to their position on their associated spur gear a setting lever 89 is provided and includes a plurality of pawls 90, 91 and 92 which engage corresponding notches each of the conductive surfaces. For example, pawl 90 will engage the notch 80 of the disc 52 to hold the disc from movement while the spur gear is rotated during positioning of the seat 11 to the desired preset position. Similarly, pawls 91 and 92 engage corresponding notches and conductive surfaces 54 and 56 to hold these surfaces in a fixed position while the spur gear frictionally connected thereto is rotated to a new position corresponding to the desired position of the seat. Therefore, after the seat is set to the new desired position the setting device 89 is released disengaging each pawl from their associated notches. Therefore, when the seat is moved to a different position other than that selected and set by the home positions of each of the conductive surfaces, energization of the memory device will cause certain areas of the conductive surfaces to engage the corresponding contacts adjacent thereto to energize the motor 11 and certain ones of the electromagnetic clutches within the transmission 14 to move the seat 11 and to rotate the spur gears until each of the conductive surfaces is again in the home position, and the seat is in the desired preselected position.

The setting device 89 includes an extended tab portion 94 which is curled over to receive a pin therethrough and provide means for securing the setting device to a wall portion of the housing, for example, the wall not shown in the plane of FIGURE 3. A shaft 96 is pivotably connected to the setting device and includes a notch 97 for engaging a catch 98 which holds the setting device forward in locking position with the notches formed on the conductive surfaces. It will be understood that the setting device 89 is associated only with the conductive surfaces 52, 54 and 56, and that a second setting device, not shown is provided for engaging notches formed on conductive surfaces 53, 55 and 57. Therefore, each setting device corresponds to a different preselectable position.

Seen in FIGURE 5 is a detailed construction of an alternate preferred arrangement of a large spur gear and associated contoured conductive surfaces. The large spur gear 49 is rotatably mounted on shaft 50 and prevented from axial movement thereon by retainers 51 which are inserted into undercut portions 51a on shaft 50. The spur gear 49 includes a body portion 100 which forms a hub of the gear and extends axially from either side of the gear along the shaft 50. Annular bosses 101 and 102 are formed on each side of the extended gear portion 103. A pair of annular grooves 104 and 105 are formed in the body portion 100. A pair of discs 106 and 107 are rotatably mounted on the hub portion 100 and on opposite sides of the extended gear portion 103. The discs 106 and 107 have contoured conductive surfaces 106a and 107a embedded therein to cooperate with, for example, extended switch assemblies 59 and 60 adjacent thereto. A washer 108 is positioned over the hub 100 and engages a radially inwardly portion of the disc 106, and a washer 109 is positioned over the hub 100 and engages a radially inwardly portion of the disc 107. A resilient clip 110 engages the undercut 104 and extends toward the washer 108 to apply an axial force to the sides of the disc 106. That is, the radially inwardly portion frictionally engages the boss 102 and washer 103 due to the force exerted by the resilient clip 110. Similarly, a resilient clip 111 engages the undercut 105 and extends in the direction of washer 109 to apply an axial force to the radially inwardly portion of the disc 107. The force holding discs 106 and 107 in place for rotation with gear 49 is sufficiently great to prevent inadvertent slippage of the discs relative to the gear but sufficiently low to enable the setting mechanism 89, of FIGURE 6, to hold the discs in a fixed position while the gear 49 rotates.

Seen in FIGURE 7 is a schematic illustration of the electric circuit arrangement of the components within the memory device 31. The electromagnetic coils 72 and 73 are energized via the switch 33a through a pair of contacts associated therewith and a movable contactor connected to a positive voltage source. For example, when the movable contactor engages the stationary contact for energizing the magnetic coil 72, the shaft 50 moves in the direction indicated by arrowed line 77. Also when the magnetic coil 72 is energized a second movable contact associated with switch 33a engages one of a pair of stationary contacts for applying a positive voltage to terminal 64' and therefrom to the contoured conductive surface 52.

The contoured conductive surfaces 52, 54 and 56 are shown in the home or neutral position corresponding to the desired position of seat 11 when switch 33a is actuated to the HIS position. Contacts 65, 165 and 265 are connected together and to one winding 125 of the motor 13. Similarly, contacts 62, 162 and 262 are connected together and to a second winding 126 of motor 13. Windings 125 and 126 provide bi-directional rotation of an armature 127 associated with the motor. Connected to contactor 64 is a solenoid actuating device 128 for actuating the clutch connected to worm gear 39. Similarly, associated with contact 164 is a solenoid actuated device associated with a second clutch 129 within transmission 14. In like manner, contact 264 is connected to a solenoid actuating device 130 for actuating the third clutch within transmission 14. The windings 125 and 126 together with the solenoid actuating devices 128, 129 and 130 are connected to the manual control switch 26 which provides means, in the conventional manner, to position seat 11 in any one of the obtainable positions. However, when seat 11 is displaced from, for example, the desired HIS position, contoured conductive surfaces 52, 54 and 56 will be displaced from their position as shown in FIGURE 7 and engage certain ones of the contacts adjacent thereto when the switch 33a is actuted to the HIS position.

For example, assume that each of the contoured conductive surfaces 52, 54 and 56 are rotated about their axes in a counterclockwise direction so that contacts 65, 165 and 265 engage the conductive surfaces when switch 33a is actuated to the HIS position. This will cause current to flow through the contact 64' from the power source and through the contoured conductive surface to contact 65 and therefrom to winding 125 of motor 13. Additionally, contact 64 will be displaced from the nonconductive area 79 and also engage the contoured conductive surface to apply power to the solenoid actuating device 128. Therefore, motor 13 will run and solenoid actuating device 128 will cause power to be transmitted along flexible shafts 19 and 25 to move the seat and to rotate the contoured conductive surface 52 back to its home position. It will also be noted that when the contoured conductive surface 52 is displaced from its home position contactor 63 does not engage the surface until the surface reaches its home position. Therefore, only when the contoured conductive surface 52 is in the home position will power then be transmitted through contact 63 to contact 164' and to the contoured conductive surface 54. Contoured conductive surface 54 then applies power through contact 165 to winding 125 to maintain the motor energized. It will be understood that if the contoured conductive surface 54 were displaced in a clockwise direction from its home position power would be applied to winding 126 of motor 13 thereby causing the motor to rotate in the opposite direction. When contoured conductive surface 54 is displaced from its home position contactor 164 engages the surface and applies power to the solenoid actuating device 129 thereby transmitting power through flexible shafts 18 and 24. Power is not applied to contact 264' until contoured conductive surface 54 is in the home position and contactor 163 is in engagement therewith. When power is applied to contoured conductive surface 56 contact 265 receives power therefrom and energizes solenoid actuating device 130 to transmit power through flexible shafts 17 and 23.

One of the unique and novel features of the control system of the present invention is that the position functions attainable by solenoids 128, 129 and 130 requiring the same direction of motor-rotation are performed simultaneously rather than sequentially. That is, if discs 52 and 56 are rotated counterclockwise to engage contacts 65 and 265 respectively, and disc 54 is rotated clockwise to engage contact 162, the power from disc 52 is also applied 56 by virtue that the contacts 65 and 265 are connected together. This will cause solenoid coils 128 and 130 to be energized while the motor 13 rotates in one direction. When disc 52 reaches the home position, contact 65 no longer receives power from the disc and also removes power from the disc 56 to deenergize solenoid 130. If disc 56 has a further distance to travel than disc 52, disc 56 will again be energized in sequence from disc 54 through contacts 163 and 264'. After disc 52 is in the home position power is then applied to disc 54 through contacts 53 and 154'. Disc 54, when displaced in a clockwise direction, will energize solenoid 129 and motor 13 to operate the motor in a direction opposite to the direction it was operated when discs 52 and 56 are displaced in a counterclockwise direction. When disc 54 reaches the home position power is then applied to disc 56 through contacts 163 and 264' to again energize motor 13 and solenoid 30 to continue the direction of movement to place the disc 56 in the home position.

Therefore, the electromechanical arrangement of the positioning device of the present invention provides means for moving or positioning a device in the most direct manner.

Switch 33a has one contact thereof connected to disc 53, not shown in FIGURE 7, so that the control device will operate from discs 53, 55 and 57. Also, motor windings 125 and 126 and solenoid devices 128, 129 and 130 are connected to corresponding switch contacts of discs 53, 55 and 57.

The intentional backlash provided in the spur gears, for example, gears 45 and 49 serve a useful purpose. To function properly, contacts 62 or 65, depending on the direction of rotation of gear 49, must fall off the conductive surface 52 at the same time contact 64 falls off the conductive surface. If these contacts do not engage nonconductive areas at the same time, either the motor 13 will keep running or the motor will not run but the clutch will remain energized. Manufacturing and assembly tolerances as well as wear make it very difficult to achieve proper simultaneous alignment of these contacts with the non-conductive areas.

Therefore, there is a purposely provided backlash between the spur gears 45 and 49 so that the follower 68 falls into the tapered sides of notch 69 and the spring tension will cause the follower to snap the disc forward insuring the disc is in the full neutral position.

Also, it will be noted that additional gears and discs, such as gears 47, 48 and 49, may be operated from the pinions 43, 44 and 45 to provide additional memory positions for the seat or machine.

Therefore, the electromechanical memory positioning system of the present invention provides means for simultaneously and sequentially positioning a device to a desired home position through various planes of travel and in two directions in each plane. Although only three contoured conductive surfaces are shown, it will be understood that many contoured conductive surfaces may be connected in cascade to provide positioning of several movable devices or positioning in more than three planes. Furthermore, although the devices shown utilizing a single bidirectional motor and a plurality of clutching devices for connecting the motor to several flexible drive shafts, it will be understood that several positioning motors can be utilized for direct connection to the device being positioned. Accordingly, it will be understood that variations and modifications may be effected without departing from the spirit and scope of the novel concepts of this invention.

We claim as our invention:

1. An electromechanical memory positioning system, comprising: an electrically energizable drive means mechanically connectable to a positionable device to move the device to a predetermined desired position when the device is displaced therefrom; a movable member mechanically connected to said drive means for movement in response to the movement of the positionable device; a contoured electrically conductive surface formed on said movable member, said contoured surface being contoured to form at least one area of non-conductance thereon; switch means positioned adjacent said conductive surface, said switch means having contact points engageable with said conductive surface and electrically connectable to said drive means; a selector switch for connection to a power source and connectable to said switch means for energizing said drive means through said switch means and said conductive surface when said positionable device is displaced from said desired position; thereby, moving said positionable device and said movable member until at least one of said contact points of said switch means engages the non-conductive area of said conductive surface thereby deenergizing said drive means and stopping said positionable device at said desired position, said movable member is a driven disc mounted for rotation about its axis, and said conductive surface is on one side of the disc, a second contoured electrically conductive surface mounted on the other side of said disc and further including second switch means for controlling the energization of said drive means in a second direction, said contoured conductive surfaces are formed from metal plates and frictionably movably secured to the sides of said disc, and further including setting means for moving the metal plates relative to said disc for changing the predetermined desired position of said movable device.

2. An electromechanical memory positioning system according to claim 1 wherein said setting means includes a notch formed in said metal plate and a lever selectively engageable with said notch to hold said plate in a fixed position while said disc is rotated relative thereto.

3. An electromechanical memory positioning system, comprising: an electrically energizable drive means mechanically connectable to a positionable device to move the device to a predetermined desired position when the device is displaced therefrom; a movable member mechanically connected to said drive means for movement in response to the movement of the positionable device; a contoured electrically conductive surface formed on said movable member, said contoured surface being contoured to form at least one area of non-conductance thereon; switch means positioned adjacent said conductive surface, said switch means having contact points engageable with said conductive surface and electrically connectable to said drive means; a selector switch for connection to a power source and connectable to said switch means for energizing said drive means through said switch means and said conductive surface when said positionable device is displaced from said desired position; thereby, moving said positionable device and said movable member until at least one of said contact points of said switch means engages the non-conductive area of said conductive surface thereby deenergizing said drive means and stopping said positionable device at said desired position, said movable member is a driven disc mounted for rotation about its axis, and said conductive surface is on one side of the disc, a second contoured electrically conductive surface mounted on the other side of said disc and further including second switch means for controlling the energization of said drive means in a second direction, and means for laterally shifting said disc so as to cause the metal plates secured to the size thereof to selectively engage only one switch means at a time.

4. An electromechanical memory positioning system comprising: electrically energizable drive means mechanically connectable to a positionable device to move the device to a predetermined desired position when the device is displaced therefrom; a plurality of movable members mechanically connected to said drive means for movement in response to the movement of the positionable device; a contoured electrically conductive surface formed on each of said movable members, said conductive surface each being contoured to form at least one area of non-conductance thereon; switch means positioned adjacent each of said contoured conductive surfaces, said switch means having a plurality of contact points for engaging said conductive surface and electrically connectable to said drive means; a selector switch for connection to a power source and connectable to one of said switch means adjacent a first of said conductive surfaces for energizing said drive means through said switch means and said first conductive surface when said positionable device is displaced from said desired position, means connecting certain ones of said contacts adjacent said first contoured surface to other ones of said contacts adjacent a subsequent contoured conductive surface for applying power thereto, means connecting selective ones of said contact points engaging said second contoured surface for applying power to a third contact surface, and so on; whereby energization of said drive means moves said positionable device and said plurality of movable members until at least one contact point associated with each of said movable members engages the non-conductive area of the associated movable member thereby deenergizing said drive means and stopping said positionable device at said desired position, said movable members are discs mounted for rotation about their axes and wherein said contoured surface is formed on one side of said disc, including a second contoured surface mounted on the other side of each of said discs and further including second switch means positioned adjacent said second contoured surface for engagement therewith, and said contoured conductive surfaces are formed of metal plates frictionably slidably mounted to the sides of said discs and further including setting means for setting the metal plates to a desired position indicative of the predetermined desired position of said positionable device.

5. An electromechanical memory positioning system according to claim 4 further including means for selectively shifting said plurality of discs laterally along their axes so as to selectively engage said switch means adjacent the conductive surface on one side of said discs when said disc is displaced in one direction and for selectively engaging said switch means on the other side of said disc when said disc means is displaced in the opposite direction.

6. An electromechanical memory device for positioning a movable article to a predetermined desired position in response to energization of a drive mechanism, comprising: a housing; at least one contoured conductive surface positioned within said housing, said surface including an area of non-conductance; a plurality of electric contacts for engaging said surface; means for moving said surface in response to movement of the article being positioned and relative to said contacts; means for completing an electric circuit between said contacts, said surface and the drive mechanism, whereby the drive mechanism will remain energized until at least one of said plurality of contacts engage the non-conductive area of said contoured conductive surface, including a protuberance formed on at least one of said contacts of said plurality of said contacts for preventing electrical contact between said contact and the conductive surface until the conductive surface is in a predetermined position relative to said plurality of said contacts, and including means for selectively setting the position of said contoured conductive surface relative to the article being moved so that said surface will be in a home position when said article is in a predetermined desired position.

7. In a motor vehicle having a power source, a seat, electrically energizable drive means for positioning said seat, and manual operated switch means for energizing said drive means from said power source, the improvement therein comprising:

a memory positioning device responsive to the movement of said seat and electrically connected to said drive means, said memory positioning device being presettable to two predetermined desired positions corresponding to two predetermined desired positions of said seat; and a two position selector switch connected between said power source and said memory positioning device for energizing said drive means for moving said seat to one of the two predetermined desired positions.

8. In a motor vehicle according to claim 1 wherein said two position selector switch has the two positions thereof labeled HIS and HER'S.

References Cited
UNITED STATES PATENTS

| | | | |
|---|---|---|---|
| 2,720,619 | 10/1955 | James | 318—466 X |
| 3,011,114 | 11/1961 | Steeb | 318—467 |
| 3,192,460 | 6/1965 | Wolff et al. | 310—191 X |
| 3,198,894 | 8/1965 | Krug | 200—11 |
| 3,204,236 | 8/1965 | Duris et al. | 340—357 |
| 3,255,319 | 6/1966 | Paine. | |
| 3,306,997 | 2/1967 | Jacobs | 200—153 X |
| 3,183,314 | 5/1965 | Pickles | 200—1 |

ROBERT K. SCHAEFER, Primary Examiner

R. A. VANDERHYE, Assistant Examiner

U.S. Cl. X.R.

200—1, 6, 153; 318—466; 340—357; 335—72